US012549993B2

(12) United States Patent
Sabouri-Sichani et al.

(10) Patent No.: US 12,549,993 B2
(45) Date of Patent: Feb. 10, 2026

(54) ENHANCED USER EQUIPMENT REPORT

(71) Applicant: Nokia Technologies Oy, Espoo (FI)

(72) Inventors: Faranaz Sabouri-Sichani, Aalborg (DK); Daniela Laselva, Aalborg (DK); Jussi-Pekka Koskinen, Oulu (FI); Malgorzata Tomala, Wroclaw (PL); Jorma Johannes Kaikkonen, Oulu (FI); Lei Du, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/916,581

(22) Filed: Oct. 15, 2024

(65) Prior Publication Data

US 2025/0380170 A1 Dec. 11, 2025

Related U.S. Application Data

(63) Continuation of application No. 18/718,362, filed on Jun. 10, 2024.

(51) Int. Cl.
*H04W 24/10* (2009.01)
*H04W 52/02* (2009.01)

(52) U.S. Cl.
CPC ........ *H04W 24/10* (2013.01); *H04W 52/0225* (2013.01)

(58) Field of Classification Search
CPC ........... H04W 36/0058; H04W 36/305; H04W 24/10; H04W 52/0225; H04W 36/0085; H04W 52/0241
See application file for complete search history.

(56) References Cited

U.S. PATENT DOCUMENTS 11,924,877 B2 * 3/2024 Kim .................. H04W 74/0808
2017/0150384 A1   5/2017 Rune et al.
2022/0394532 A1 * 12/2022 Thangarasa ....... H04W 52/0209
(Continued)

FOREIGN PATENT DOCUMENTS

CN      108307686 A      7/2018
WO   2021/090281 A1     5/2021
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.
(Continued)

*Primary Examiner* — Brian T O Connor
(74) *Attorney, Agent, or Firm* — Nokia Technologies Oy

(57) ABSTRACT

Embodiments of the present disclosure relate to devices, methods, apparatuses and computer readable storage media of the enhancement on the UE report. The method comprises generating, a report including information related to a measurement relaxation performed by the first device based on a measurement relaxation configuration, the report being associated with at least one of a RLF report or a successful handover report; and transmitting the report to the second device. In this way, the network can be aware about whether a failure was experienced in conjunction with the measurements relaxation. With the enhanced report, the network may determine the future configuration of the measurement relaxation.

18 Claims, 5 Drawing Sheets

(56) References Cited

U.S. PATENT DOCUMENTS

| | | | | |
|---|---|---|---|---|
| 2023/0239712 | A1* | 7/2023 | Kuang | H04W 52/0216 |
| 2024/0015610 | A1* | 1/2024 | Fang | H04W 36/362 |
| 2024/0334261 | A1* | 10/2024 | Teyeb | H04W 24/08 |
| 2024/0406830 | A1* | 12/2024 | Yan | H04W 24/02 |
| 2025/0081019 | A1* | 3/2025 | Li | H04W 24/10 |
| 2025/0081101 | A1* | 3/2025 | Soldati | H04W 36/0066 |

FOREIGN PATENT DOCUMENTS

| | | |
|---|---|---|
| WO | 2021/204002 A1 | 10/2021 |
| WO | 2021/254590 A1 | 12/2021 |
| WO | 2022/152961 A1 | 7/2022 |
| WO | 2023/015403 A1 | 2/2023 |

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.8.0, Dec. 2021, pp. 1-152.

"3rd Generation Partnership Project; Technical Specification Group Radio Access Network; Radio measurement collection for Minimization of Drive Tests (MDT); Overall description; Stage 2 (Release 16)", 3GPP TS 37.320, V16.7.0, Dec. 2021, pp. 1-35.

"3rd Generation Partnership Project; Technical Specification Group Radio Access Network; NR; Physical layer procedures for control (Release 17)", 3GPP TS 38.213, V17.0.0, Dec. 2021, pp. 1-225.

"3rd Generation Partnership Project; Technical Specification Group Radio Access Network; NR; Requirements for support of radio resource management (Release 17)", 3GPP TS 38.133, V17.4.0, Dec. 2021, 3230 pages.

"3rd Generation Partnership Project; Technical Specification Group Radio Access Network; Study on RAN-centric data collection and utilization for LTE and NR (Release 16)", 3GPP TR 37.816, V16.0.0, Jul. 2019, pp. 1-35.

"Open issues on connected mode measurements for RFL", 3GPP TSG-RAN2 Meeting #115-e, R2-2107429, Agenda: 9.1.2, Huawei, Aug. 16-27, 2021, pp. 1-4.

"On RLM and RLF relaxation for UE power saving", 3GPP TSG-RAN WG4 Meeting # 100-e, R4-2113887, Agenda: 9.14.2, ZTE Corporation, Aug. 16-27, 2021, 3 pages.

"Discussion on RLM/BFD/RRM relaxation", 3GPP TSG RAN WG1#104-e, R1-2104375, Agenda: 8.7.3, vivo, May 10-27, 2021, 2 pages.

"Discussion on RLM Relaxation", 3GPP TSG RAN WG1 #105-e, R1-2104791, Agenda: 8.7.3, Oppo, May 10-27, 2021, 2 pages.

"Report of 3GPP TSG RAN WG2 meeting #114-e, Online", 3GPP TSG-RAN WG2 meeting #115-e, R2-2106901, Agenda: 2.2, Etsi Mcc, Aug. 5, 2021, pp. 1-295.

International Search Report and Written Opinion received for corresponding Patent Cooperation Treaty Application No. PCT/CN2022/072360, dated Oct. 9, 2022, 9 pages.

"[E235] UE power savings impact on MDT", 3GPP TSG-RAN WG2 #110e, R2-2004723, Agenda: 6.12.4, Ericsson, Jun. 1-12, 2020, 18 pages.

Office action received for corresponding Chinese Patent Application No. 202280082707.4, dated Nov. 30, 2024, 7 pages of office action and 5 pages of translation available.

Office action received for corresponding Chinese Patent Application No. 202280082707.4, dated Mar. 8, 2025, 5 pages of office action and 10 pages of translation available.

"3rd Generation Partnership Project; Technical Specification Group Radio Acess Network; NR; Radio Resource Control (RRC) protocl specification (Release 17)", 3GPP TS 38.331, V17.0.0, Mar. 2022, pp. 1-1221.

Non-Final Office action received for corresponding U.S. Appl. No. 18/718,362, dated Mar. 17, 2025, 14 pages.

* cited by examiner

ENHANCED USER EQUIPMENT REPORT

RELATED APPLICATIONS

This application is a 37 C.F.R. § 1.53(b) continuation of co-pending U.S. patent application Ser. No. 18/718,362 filed Jun. 10, 2024, which claims priority to PCT Application No. PCT/CN2022/072360, filed on Jan. 17, 2022, which is incorporated herein by reference in its entirety.

FIELD

Embodiments of the present disclosure generally relate to the field of telecommunication and in particular to devices, methods, apparatuses and computer readable storage media of an enhanced User Equipment (UE) report.

BACKGROUND

In the topic of data collection enhancement in New Radio (NR) for Self-Optimized Network (SON)/Minimization of Drive Test (MDT), it has been agreed that the UE report of, for example, the Radio Link Failure (RLF), accessibility measurements, or a successful handover may be enhanced.

For the purpose of UE power saving, enhancements on power saving techniques for the UE in a connected mode have been discussed for minimizing the impact on the system performance.

SUMMARY

In general, example embodiments of the present disclosure provide a solution of the enhancement on the UE report.

In a first aspect, there is provided a first device. The first device comprises at least one processor; and at least one memory including computer program codes; the at least one memory and the computer program codes are configured to, with the at least one processor, cause the first device at least to generate, a report including information related to a measurement relaxation performed by the first device based on a measurement relaxation configuration, the report being associated with at least one of a RLF report or a successful handover report; and transmit the report to the second device.

In a second aspect, there is provided a second device. The second device comprises at least one processor; and at least one memory including computer program codes; the at least one memory and the computer program codes are configured to, with the at least one processor, cause the second device at least to receive, from a first device, a report including information related to a measurement relaxation, the report being associated with at least one of a RLF report or a successful handover report; and determine, based on the report, an adjustment to a measurement relaxation configuration.

In a third aspect, there is provided a method. The method comprises generating, a report including information related to a measurement relaxation performed by the first device based on a measurement relaxation configuration, the report being associated with at least one of a RLF report or a successful handover report; and transmitting the report to the second device.

In a fourth aspect, there is provided a method. The method comprises receiving, from a first device, a report including information related to a measurement relaxation, the report being associated with at least one of a RLF report or a successful handover report; and determining, based on the report, an adjustment to a measurement relaxation configuration.

In a fifth aspect, there is provided an apparatus comprising means for generating, a report including information related to a measurement relaxation performed by the first device based on a measurement relaxation configuration, the report being associated with at least one of a RLF report or a successful handover report; and means for transmitting the report to the second device.

In a sixth aspect, there is provided an apparatus comprising means for receiving, from a first device, a report including information related to a measurement relaxation, the report being associated with at least one of a RLF report or a successful handover report; and means for determining, based on the report, an adjustment to a measurement relaxation configuration.

In a seventh aspect, there is provided a computer readable medium having a computer program stored thereon which, when executed by at least one processor of a device, causes the device to carry out the method according to the third aspect or the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
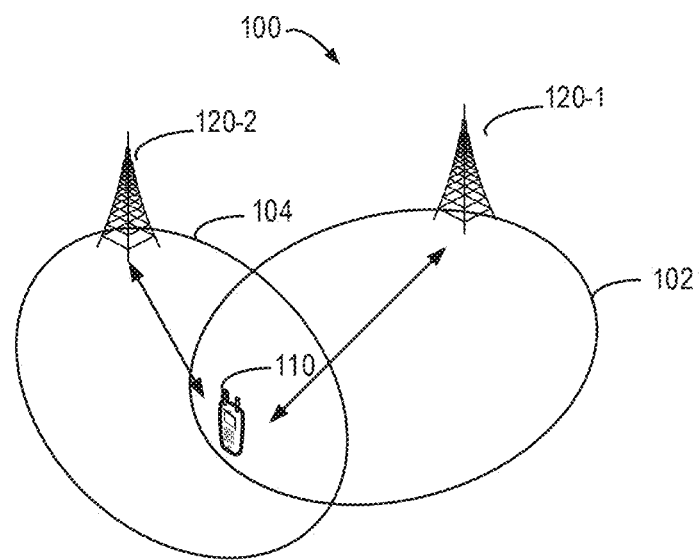
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure.

The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements. These elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VoTP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 may comprise a terminal device 110 (hereinafter may also be referred to as a UE 110 or a first device 110). The communication network 100 may further comprise a network device 120-1 (hereinafter may also be referred to as a gNB 120-1, a second device 120-1 or a third device 120-1). The network device 120-1 can manage a cell 102. The terminal device 110 and the network device 120-1 can communicate with each other in the coverage of the cell 102.

The communication network 100 may further comprise a network device 120-2 (hereinafter may also be referred to as a gNB 120-2 or a second device 120-2). The network device 120-2 can manage a cell 104. In some scenarios, the terminal device 110 may perform a handover procedure from the network device 120-1 to the network device 120-2. After the handover completes, the terminal device 110 may be served by the cell 104. In this case, the network device 120-1 may act as a source network device in the handover procedure and the network device 120-2 may act as a target network device in the handover procedure. When the network device 120-2 is referred to as a second device, the terminal device 120-1 may be referred to as a third device 120-1.

In some embodiments of the present disclosure, the network device 120-1 and the network device 120-2 may also be referred to as a network device 120, collectively.

It is to be understood that the number of network devices and terminal devices shown in FIG. 1 is given for the purpose of illustration without suggesting any limitations. The communication network 100 may include any suitable number of network devices and terminal devices.

In the topic of UE power saving, the feasibility and performance impact of relaxing UE measurements, at least comprising a Radio Link Monitoring (RLM) measurement, a Beam Failure Detection (BFD) measurement, a Radio Resource Measurement (RRM) or a Layer 1 Reference Signal Received Power (L1-RSRP) measurement, have been analysed (e.g., for low mobility UE with short Discontinuous Reception (DRX) periodicity/cycle, etc.).

The criteria for triggering the measurement relaxation of the UE or for the UE to move back to a normal measurement mode from the measurement relaxation mode, and the corresponding behaviour of the UE in these procedures are to be aligned between the UE and the communication network. The UE may relax its measurements whenever the predefined or configured relaxation criteria are fulfilled and in addition, the network should be able to explicitly inform the UE when the UE is allowed to relax its measurements based on network implementation.

The UE may not be forced to relax its measurements even when the relaxation criteria are evaluated to be fulfilled or when the UE receives explicit message from the network indicating that the UE is allowed to relax its measurements. The UE may still take a decision not to enter into a measurement relaxation mode based on its implementation, for example, if the UE determines that its mobility performance may be impacted, if the power saving gain is limited in a given period, and/or for other suitable reasons.

Therefore, the network may not be aware about whether the UE is performing a normal measurement or a relaxed measurement, even if the UE is allowed to enter into the measurement relaxation mode in a case where, for example, one or more conditions for the measurement relaxation are fulfilled.

However, the measurement relaxation may have an impact on system level performance in terms of, for example, increased delay in detecting a RLF, a beam failure, or some other behavior. Thus, the network may not be aware about whether a failure was experienced in conjunction with the measurement relaxation, which may help to determine the future configuration of the measurement relaxation by the network.

The solution of the present disclosure proposes an enhanced mechanism of the UE report. In this solution, the UE may generate, a report including information related to a measurement relaxation performed by the UE based on a measurement relaxation configuration provided by a gNB. The report is associated with at least one of a RLF report or a successful handover report. The UE may transmit the report to the gNB.

Principle and implementations of the present disclosure will be described in detail below with reference to FIGS. 2-3.

Figure 2:
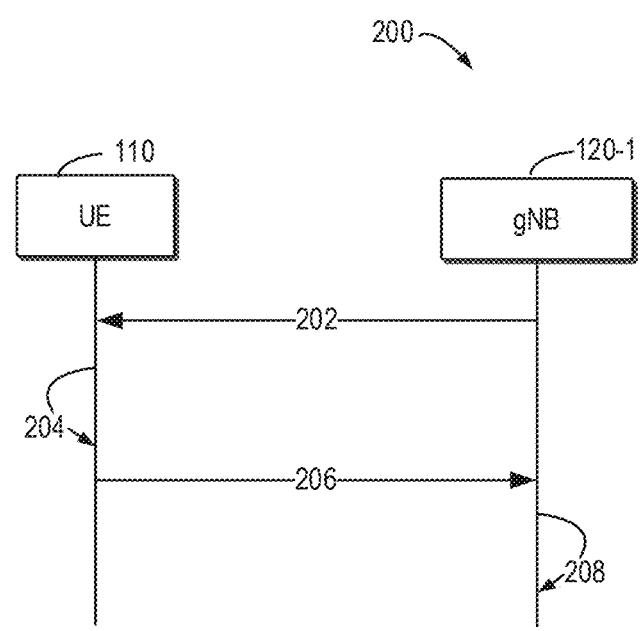
FIG. 2 shows a signaling chart illustrating a process of the enhancement on the UE report according to some example embodiments of the present disclosure.

FIG. 2 shows a signaling chart illustrating a process 200 of the enhancement on the UE report according to some example embodiments of the present disclosure. For the purpose of discussion, the process 200 will be described with reference to FIG. 1. The process 200 may involve the UE 110 and the gNB 120-1 as shown in FIG. 1.

Now the reference is made to FIG. 2. As shown, the gNB 120-1 may transmit 202 a measurement relaxation configuration to the UE 110. The measurement relaxation configuration may at least comprise one or more relaxation criteria for the UE to enter the measurement relaxation mode.

If the UE 110 determines, based on the measurement relaxation configuration, that one or more relaxation criteria are fulfilled, the UE 110 may enter the measurement relaxation mode and perform one or more corresponding measurements in the measurement relaxation mode.

In some example embodiments, the corresponding measurements may comprise at least one of a BFD measurement, a RLM measurement, a RRM or a L1-RSRP measurement. It is to be understood that the measurement relaxation may also be performed for any other suitable measurement at the UE side.

When RLF is detected or declared at the UE 110, a RLF report may be generated at the UE 110. In general, a RLF report may usually contain information related to a previous (e.g., the latest) connection failure experienced by the UE. For example, the connection failure can be a RLF or a Handover Failure (HOF). The information contained in the RLF report may comprise, for example, latest radio measurement results associated with the serving cell and/or neighbour cells. The information contained in the RLF report may also comprise at least one reason for the connection failure, for example, indicated by a field called "rlf-Cause". "rlf-Cause" with common Random Access (RA) information which is optionally included when "connectionFailureType" is set to HOF or when "connectionFailureType" is set to RLF and the "rlf-cause" equals to 'randomAccessProblem' or 'beamRecoveryFailure'.

Furthermore, the information contained in the RLF report may usually further comprise location information for MDT and SON and parameters of one or more timers related the RLF, for example, a timer for the time elapsed since failure.

Referring back to FIG. 2, When RLF is detected or declared at the UE 110, the UE 110 may generate 204 a RLF report including information related to the measurement relaxation, which may be performed by the UE 110 based on the received measurement relaxation configuration provided by the gNB 120-1.

In some example embodiments, the information related to the measurement relaxation included in the RLF report may indicate whether the UE 110 had relaxed the measurements before experiencing the failure, i.e., during a time window associated with a declaration of the RLF.

For example, a new parameter, such as "RLM-BFD-measurementInformation-r17", may be added to the RLF report with detailed information about the RLM/BFD measurement relaxation configuration.

As an option, the field "rlf-Cause" in the RLF report may be changed due to the information related to the measurement relaxation. For example, the "rlf-Cause" can be set to "t310-Expiry under RLM/BFD relaxation". T310 used herein may be referred to as a timer associated with the RLF.

As another option, the "rlf-Cause" value may determine the presence of the new parameter "RLM-BFD-measurementInformation-r17", i.e., the UE 110 may add the parameter to the RLF report in case "rlf-Cause" is set to "t310 Expiry".

In some example embodiments, the information related to the measurement relaxation may also indicate whether the measurement relaxation was allowed based on a dedicated command from the gNB 120-1 or based on a determination by the UE 110 in a case where at least one relaxation criterion indicated in the measurement relaxation configuration is fulfilled.

In some example embodiments, the information related to the measurement relaxation included in the RLF report may indicate how long time the UE 110 had relaxed the measurements before the RLF is detected.

It is also possible that the UE 110 may add further information such as at least one relaxation criterion for the measurement relaxation that was fulfilled. For example, good serving quality, not-at-cell-edge-criterion, low-mobility-criterion, stationarity criterion, and the applied relaxation factor(s), etc.

In some example embodiments, the measurement results for serving cell quality and/or mobility status may also be added to the information related to the measurement relaxation. The UE 110 may detect whether the at least one relaxation criterion is to be fulfilled based on the measurement results. In addition, the information may also indicate that over which SSB beams has computed the RSRP for low mobility criterion or the/number of SSB beams has computed the RSRP for low mobility criterion.

In some example embodiments, the information related to the measurement relaxation included in the RLF report may indicate a margin for a determination of a satisfied serving cell quality condition. For example, a margin in dB applied to Qin for the determination of the good serving cell quality condition.

In some example embodiments, the information related to the measurement relaxation may also indicate that the RLF related parameters, such as N310 and T310, applied during the relaxation period and the normal RLF related parameters. Furthermore, the UE 110 may report the TCI state at the time of experiencing the RLF.

Moreover, it is also possible that the information related to the measurement relaxation may indicate whether a condition for quitting the measurement relaxation is evaluated just before experiencing the RLF.

After generating the RLF report including information related to the measurement relaxation, the UE 110 may transmit 206, to the gNB 120-1, the RLF report including the information related to the measurement relaxation.

In some example embodiments, the RLF report including information related to the measurement relaxation may be appended to a Radio Resource Control (RRC) signalling, for example, the RRC complete signalling during a RRC related procedure. For example, the RRC procedure may refer to a RRC setup procedure, a RRC re-establishment procedure or a RRC reconfiguration procedure.

In some example embodiments, the UE 110 may also transmit an indication of an availability of the information related to the measurement relaxation to the gNB 120-1. The indication of an availability of the information may be indicated in a RRC complete signalling during a RRC related procedure. For example, the RRC procedure may refer to a RRC setup procedure, a RRC re-establishment procedure or a RRC reconfiguration procedure.

If an availability of RLF report is informed to gNB 120-1 in a RRC Reestablishment procedure and the gNB 120-1 may acquire the information by the message "UEInformationRequest". The UE 110 may add the RLF report to its response message "UEInformationRespose". An example of changes in the information in the returned RLF report can be represented as below.

TABLE 1

An example of changes in the returned RLF report

```
nr-RLF-Report-r16 SEQUENCE {
    measResultLastServCell-r16         MeasResultRLFNR-r16,
    measResultNeighCells-r16 SEQUENCE {
        measResultListNR-r16           MeasResultList2NR-r16 OPTIONAL,
        measResultListEUTRA-r16          MeasResultList2EUTRA-r16 OPTIONAL
    } OPTIONAL,
    c-RNTI-r16 RNTI-Value,
    previousPCellId-r16 CHOICE {
        nrPreviousCell-r16             CGI-Info-Logging-r16,
        eutraPreviousCell-r16           CGI-InfoEUTRALogging
    } OPTIONAL,
```

TABLE 1-continued

An example of changes in the returned RLF report

```
failedPCellId-r16 CHOICE {
    nrFailedPCellId-r16 CHOICE {
        cellGlobalId-r16           CGI-Info-Logging-r16,
        pci-arfcn-r16 SEQUENCE {
            physCellId-r16         PhysCellId,
            carrierFreq-r16        ARFCN-ValueNR
        }
    },
    eutraFailedPCellId-r16 CHOICE {
        cellGlobalId-r16           CGI-InfoEUTRALogging,
        pci-arfcn-r16 SEQUENCE {
            physCellId-r16         EUTRA-PhysCellId,
            carrierFreq-r16        ARFCN-ValueEUTRA
        }
    }
},
reconnectCellId-r16 CHOICE {
    nrReconnectCellId-r16                  CGI-Info-Logging-r16,
    eutraReconnectCellId-r16               CGI-InfoEUTRALogging
} OPTIONAL,
timeUntilReconnection-16                   TimeUntilReconnection-16 OPTIONAL,
reestablishmentCellId-r16                  CGI-Info-Logging-r16 OPTIONAL,
timeConnFailure-r16                        INTEGER (0..1023) OPTIONAL,
timeSinceFailure-r16                       TimeSinceFailure-r16,
connectionFailureType-r16                  ENUMERATED {rlf, hof},
rlf-Cause-r16                              ENUMERATED {t310-Expiry, randomAccessProblem,
                                              rlc-MaxNumRetx,beamFailureRecoveryFailure,
                                              lbtFailure-r16,bh-rlfRecoveryFailure,
                                              RLM-BFDrelaxationFailure, spare1},
locationInfo-r16                           LocationInfo-r16 OPTIONAL,
noSuitableCellFound-r16                    ENUMERATED {true} OPTIONAL,
ra-InformationCommon-r16                   RA-InformationCommon-r16 OPTIONAL,
RLM-BFD-measurementInformation-r17         RLM-BFD-measurementInformation-
r17      OPTIONAL,
{
mobilityInfo-r17           mobilityInfo-r17 OPTIONAL
servingCellQualityInfo-r17     servingCellQualityInfo-r17 OPTIONAL
...
}
...
},
```

As shown in Table, a new parameter "RLM-BFD-measurementInformation-r17" is added to the RLF report. It is to be understood that Table 1 is one possible example of changes in the returned RLF report and that the changes in the RLF report may also be represented in any other suitable format.

After receiving the RLF report including the information related to the measurement relaxation, the gNB 120-1 may adjust 208 the measurement relaxation configuration, which is previously configured by the gNB 120-1 and based on which the UE 110 had perform the measurement relaxation, based on the received RLF and the information related to the measurement relaxation reported by the UE 110.

For example, the gNB 120-1 may determine whether a mobility configuration is to be adjusted based on the information related to the measurement relaxation included in the RLF report.

In some example embodiments, in case of RLF, the gNB 120-1 may also optimize one or more parameters associated with the measurement relaxation assigned to the UE 110 based on the RLF report.

For example, the gNB 120-1 may adjust at least one relaxation criterion in the measurement relaxation configuration previously used by the UE 110 to perform the measurement relaxation.

Furthermore, the gNB 120-1 may also disable (not configure) measurement relaxation for the UE 110, if the UE 110 has reported to have experienced RLF while using relaxed measurements.

It is also possible that the gNB 120-1 may configure at least one adjusted relaxation criterion which is more conservative compared to the at least one relaxation criterion in the measurement relaxation configuration previously used by the UE 110 to perform the measurement relaxation.

In some example embodiments, the gNB 120-1 may adjust the RLF related parameters for the UE based on the information related to the measurement relaxation, for example, the N310/T310 values may be decreased compared to the previously configured value.

Although not shown in FIG. 2, it is also possible that the UE 110 may transmit the RLF report including the information related to measurement relaxation to a new gNB other than the gNB 120-1, for example, when UE 110 has connected with the new gNB after a RRCRe-establishment procedure. The new gNB may also perform the adjustment for the measurement relaxation configuration, which is substantially similar with that performed by the gNB 120-1 as described above.

In some other scenarios, the information related to the measurement relaxation may also be included in the successful handover report. FIG. 3 shows a signaling chart illustrating a process 300 of the enhancement on the UE report according to some example embodiments of the present disclosure. For the purpose of discussion, the process 300 will be described with reference to FIG. 1. The process 300 may involve the UE 110, the gNB 120-1 and the gNB 120-2, as shown in FIG. 1.

In this scenario, the gNB 120-1 may act as a source gNB and the gNB 120-2 may act as a target gNB. The UE 110 may be served by the gNB 120-1 before the handover completes.

Figure 3:
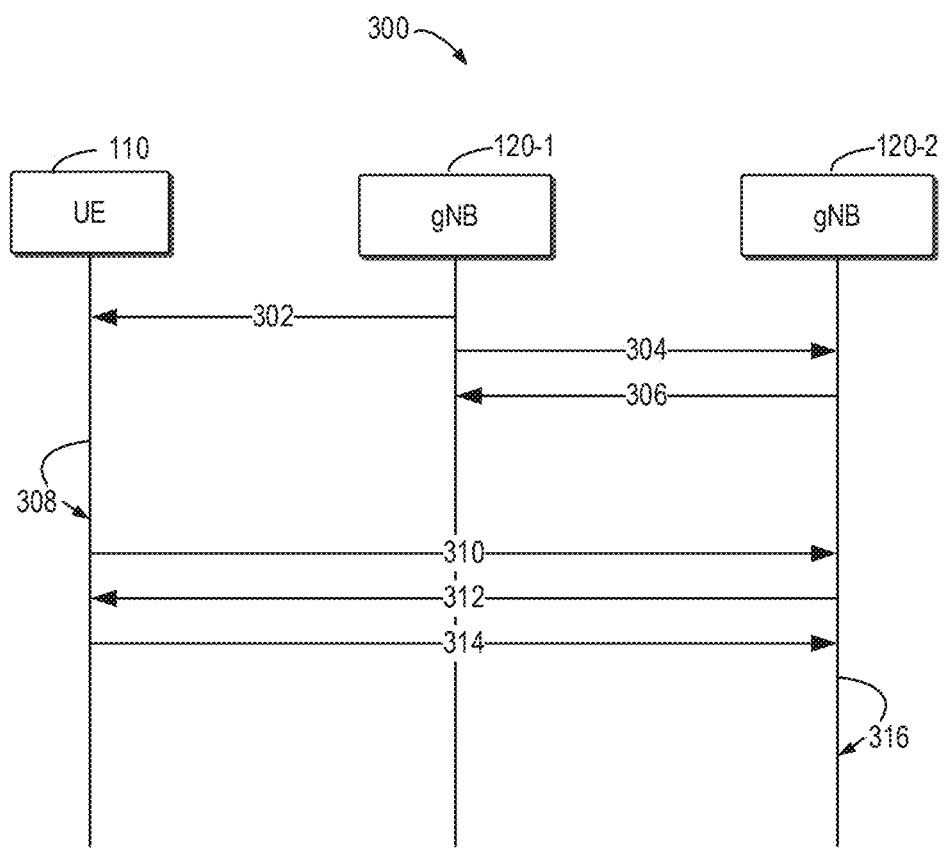
FIG. 3 shows a signaling chart illustrating a process of the enhancement on the UE report according to some example embodiments of the present disclosure.

Now the reference is made to FIG. 3. Similar with the process 200, the gNB 120-1 may transmit 302 a measurement relaxation configuration to the UE 110. The measurement relaxation configuration may at least comprise one or more relaxation criteria for the UE to enter the measurement relaxation mode.

Similarly, the corresponding measurements may comprise at least one of a BFD measurement, a RLM measurement, a RRM or a L1-RSRP measurement. It is to be understood that the measurement relaxation may also be performed for any other suitable measurement at the UE side.

If the UE 110 determines, based on the measurement relaxation configuration, that one or more relaxation criteria are fulfilled, the UE 110 may enter the measurement relaxation mode and perform one or more corresponding measurements in the measurement relaxation mode. In one embodiment, the UE may enter the measurement relaxation mode upon receiving an explicit message from the network node to do so.

The UE 110 may also detect whether a RLF occurs. If the RLF is detected, the UE 110 may record the RLF and perform as described in relation to FIG. 2. It is to be understood that the RLF may not be detected during the measurement relaxation.

If the gNB 120-1 determines that a handover procedure is to be performed, for example, when gNB 120-1 determines that the connection between the UE 110 and the gNB 120-1 is getting worse based on measurement reports received from the UE 110, the gNB 120-1 may transmit 304 a handover request to the gNB 120-2. The gNB 120-2 may transmit 306 an acknowledge response for the handover request together with the handover configuration to the gNB 120-1.

After the handover procedure has been triggered, the UE 110 may initiate a random access procedure to connect with the gNB 120-2.

After the handover has been successfully completed, the UE 110 may generate 308 a successful handover report including the information related to the measurement relaxation while the UE 110 was served by the source gNB 120-1. In general, a successful handover report may also comprise RLM related information, BFD related information and the handover related information.

The UE 110 may transmit 310 an indication of an availability of the successful handover report to the gNB 120-2. This may be indicated in, for example, a RRC message e.g., RRCReconfigurationComplete.

If a request for the successful handover report is received 312 from the gNB 120-2, the UE 110 may transmit 314, to the gNB 120-2, a successful handover report including information related to the measurement relaxation.

It is also possible that the successful handover report including the information related to the measurement relaxation can be transmitted via a RRCReconfigurationComplete message when the handover procedure completes.

In some example embodiments, the UE 110 may add the information related to the measurement relaxation to the successful handover report based on a command from the gNB 120-2. For example, when the UE 110 transmits an indication of an availability of the successful handover report to the gNB 120-2, the UE 110 may also inform gNB 120-2 that the information related to the measurement relaxation is available. The gNB 120-2 may indicate the information related to the measurement relaxation is to be added in the successful handover report. < >

In some example embodiments, the UE 110 may add the information related to the measurement relaxation to the successful handover report based on at least one relaxation criterion indicated in the measurement relaxation configuration provided by the gNB 120-1, for example, when at least one relaxation criterion was fulfilled.

Similar with the RLF report, the information related to the measurement relaxation included in the successful handover report may indicate whether the UE 110 had relaxed the measurements before the handover completes. For example, a new parameter, such as "RLM-BFD-measurementInformation-r17", may be added to the successful handover report with detailed information about the RLM/BFD measurement relaxation configuration.

In some example embodiments, the information related to the measurement relaxation may also indicate whether the measurement relaxation was allowed based on a dedicated command from the gNB 120-1 or based on a determination by the UE 110 in a case where at least one relaxation criterion indicated in the measurement relaxation configuration is fulfilled.

In some example embodiments, the information related to the measurement relaxation included in the successful handover report may indicate how long time the UE 110 had relaxed the measurements before the handover completes.

It is also possible that the UE 110 may add further information such as at least one relaxation criterion for the measurement relaxation that was fulfilled. For example, good serving quality, not-at-cell-edge-criterion, low-mobility-criterion, stationarity criterion, and the applied relaxation factor(s), etc.

In some example embodiments, the measurement results for serving cell quality and/or mobility status may also be added to the information related to the measurement relaxation. The UE 110 may detect whether the at least one relaxation criterion is to be fulfilled based on the measurement results. In addition, the information may also indicate that over which SSB beams has computed the RSRP for low mobility criterion or the/number of SSB beams has computed the RSRP for low mobility criterion.

In some example embodiments, the information related to the measurement relaxation included in the successful handover report may indicate a margin for a determination of a satisfied serving cell quality condition. For example, a margin in dB applied to Qin for the determination of the good serving cell quality condition.

Moreover, it is also possible that the information related to the measurement relaxation may indicate whether a condition for quitting the measurement relaxation is evaluated before the handover completes.

After receiving the successful handover report together with the information related to the measurement relaxation, the gNB 120-2 may adjust 316 the measurement relaxation configuration based on the received successful handover report and the information related to the measurement relaxation.

For example, the gNB 120-2 may determine whether a mobility configuration is to be adjusted based on the information related to the measurement relaxation.

In the solution of present disclosure, a mechanism for the enhancement on the UE report is proposed. In this way, the network can be aware about whether a failure was experienced in conjunction with the measurement relaxation. With the enhanced report, the network may determine the future configuration of the measurement relaxation.

Figure 4:
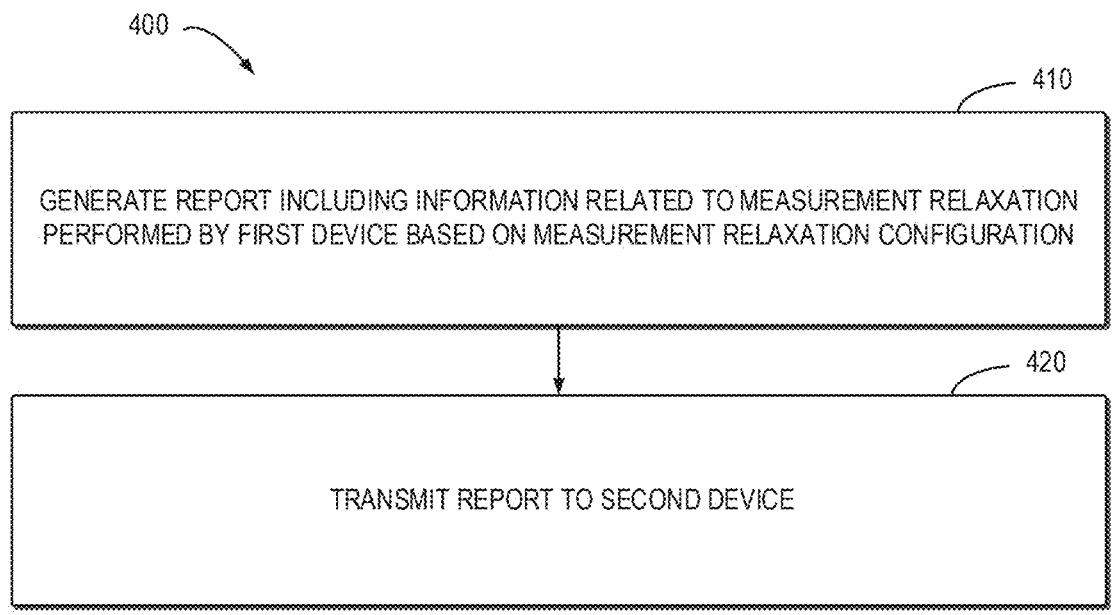
FIG. 4 shows a flowchart of an example method of the enhancement on the UE report according to some example embodiments of the present disclosure.

FIG. 4 shows a flowchart of an example method 400 of the enhancement on the UE report according to some example embodiments of the present disclosure. The method 400 can be implemented at the first device 110 as shown in FIG. 1. For the purpose of discussion, the method 400 will be described with reference to FIG. 1.

At 410, the first device generates, a report including information related to a measurement relaxation performed by the first device based on a measurement relaxation configuration, the report being associated with at least one of a RLF report or a successful handover report.

In some example embodiments, the measurement relaxation is associated with a relaxation on a measurement comprising at least one of a RLM measurement, a BFD measurement, a RRM or a L1 RSRP measurement.

In some example embodiments, the information indicates at least one of whether the measurement relaxation has been performed during a time window associated with a declaration of the RLF or at a time point when the successful handover report is triggered; whether the measurement relaxation was allowed based on a dedicated command from the second device or based on a determination by the first device that at least one relaxation criterion indicated in the measurement relaxation configuration is fulfilled; a time associated with the measurement relaxation before the RLF is detected or the time point when the successful handover report is triggered; at least one relaxation criterion indicated in the measurement relaxation configuration is fulfilled; a margin for a determination of a satisfied serving cell quality condition; one or more RLF related parameters applied during the at least one of the RLM measurement relaxation and one or more further RLF related parameters applied when the RLM measurement is unrelaxed; or whether a condition for quitting the measurement relaxation is evaluated before the RLF occurs or the successful handover.

In some example embodiments, the information comprises the measurement relaxation configuration.

In some example embodiments, the information is associated with a field related to a RLF reason in the RLF report.

In some example embodiments, the information comprises respective measurement results associated with the at least one relaxation criterion for the measurement relaxation that were fulfilled.

At 420, the first device transmits the report to a second device.

In some example embodiments, the first device may transmit the information via a radio resource complete message in at least one of: a RRC setup procedure, a RRC re-establishment procedure or a RRC reconfiguration procedure.

In some example embodiments, the first device may transmit an indication of an availability of the information via a radio resource complete message in at least one of: a RRC setup procedure, a RRC re-establishment procedure or a RRC reconfiguration procedure.

In some example embodiments, the first device may add the information to the successful handover report based on a command from the second device or at least one relaxation criterion.

In some example embodiments, the first device may receive the measurement relaxation configuration from the second device; or a third device, the first device being serving by the third device before performing a handover procedure to the second device.

In some example embodiments, the first device comprises a terminal device and the second device comprises a network device.

Figure 5:
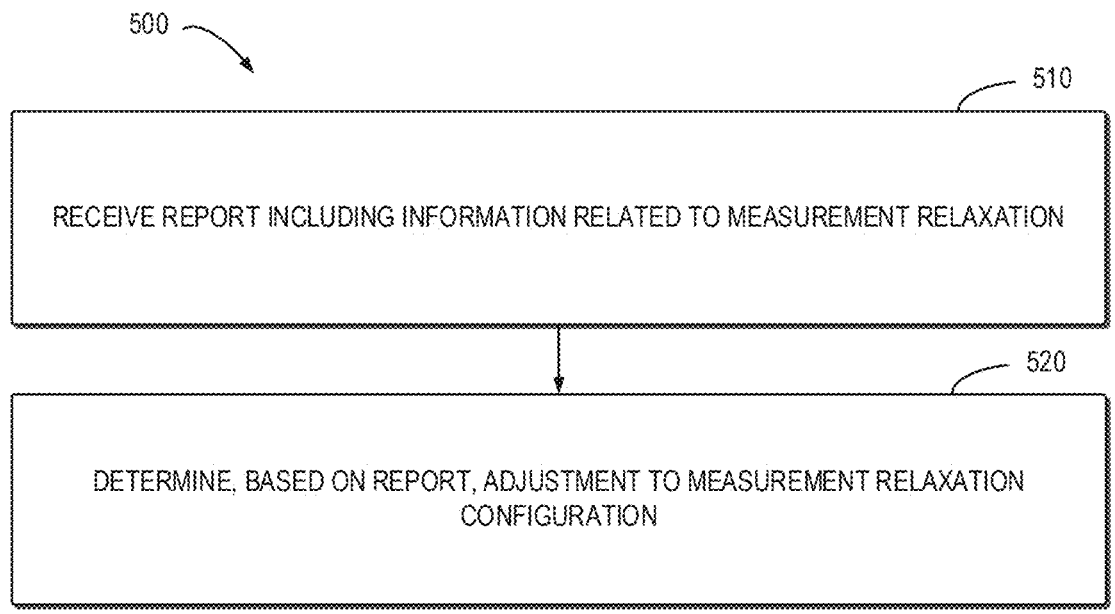
FIG. 5 shows a flowchart of an example method of the enhancement on the UE report according to some example embodiments of the present disclosure.

FIG. 5 shows a flowchart of an example method 500 of the enhancement on the UE report according to some example embodiments of the present disclosure. The method 500 can be implemented at the second device 120-1 or 120-2 as shown in FIG. 1. For the purpose of discussion, the method 500 will be described with reference to FIG. 1.

At 510, the second device receives, from the first device, a report including information related to a measurement relaxation performed by the first device based on a measurement relaxation configuration, the report being associated with at least one of a RLF report or a successful handover report.

In some example embodiments, the measurement relaxation is associated with a relaxation on a measurement comprising at least one of a RLM measurement, a BFD measurement, a RRM or a L1 RSRP measurement.

At 520, the second device determines, based on the report, an adjustment to a measurement relaxation configuration.

In some example embodiments, the second device may determine the adjustment for a mobility configuration based on the report.

In some example embodiments, if the second device determines that the RLF occur based on the report, the second device may determine the adjustment for one or more parameters related to the measurement relaxation.

In some example embodiments, the second device may generate an indication that the measurement relaxation is to be terminated when the RLF occurs.

In some example embodiments, the second device may determine one or more adjusted relaxation criteria for the measurement relaxation, the one or more adjusted relaxation criteria that is more conservative than at least one relaxation criterion previously applied for the measurement relaxation.

In some example embodiments, if the second device determines that the RLF occur based on the report, the second device may determine the adjustment for one or more parameters related to the RLM.

In some example embodiments, the second device may adjust a threshold number of a counter associated with the RLM or adjust time duration of a timer associated with the RLM.

In some example embodiments, the second device may determine the measurement relaxation configuration for the first device; and transmit the measurement relaxation configuration to the first device.

In some example embodiments, if the second device determines that the handover to the second device is successful without the RLF, the second device may adjust the measurement relaxation configuration configured by the second device based on a further measurement relaxation configuration configured by a third device, the first device being served by the third device before the handover completes.

In some example embodiments, if the second device determines that the RLF is indicated in successful handover report, the second device may transmit an indication of the RLF to a third device, to cause the third device to adjust a further measurement relaxation configuration configured by a third device, the first device being served by the third device before the handover to the second device completes.

In some example embodiments, the first device comprises a terminal device and the second device comprises a network device.

In some example embodiments, an apparatus capable of performing the method 400 (for example, implemented at the ULE 110) may comprise means for performing the respective steps of the method 400. The means may be implemented in any suitable form. For example, the means may be implemented in a circuitry or software module.

In some example embodiments, the apparatus comprises means for generating, a report including information related to a measurement relaxation performed by the first device based on a measurement relaxation configuration, the report being associated with at least one of a RLF report or a successful handover report; and means for transmitting the report to the second device.

In some example embodiments, an apparatus capable of performing the method 400 (for example, implemented at the gNB 120-1 or 120-2) may comprise means for performing the respective steps of the method 400. The means may be implemented in any suitable form. For example, the means may be implemented in a circuitry or software module.

In some example embodiments, the apparatus comprises means for receiving, from a first device, a report including information related to a measurement relaxation, the report being associated with at least one of a RLF report or a successful handover report; and means for determining, based on the report, an adjustment to a measurement relaxation configuration.

Figure 6:
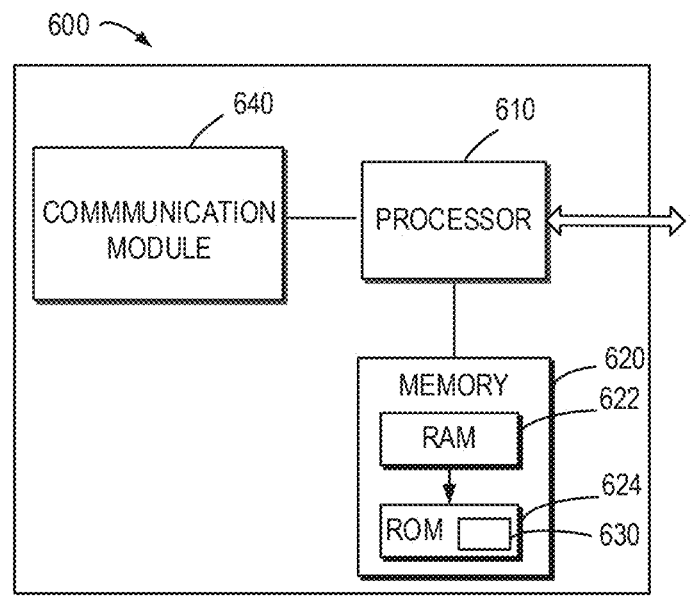
FIG. 6 shows a simplified block diagram of a device that is suitable for implementing example embodiments of the present disclosure.

FIG. 6 is a simplified block diagram of a device 600 that is suitable for implementing embodiments of the present disclosure. The device 600 may be provided to implement the communication device, for example the UE 110 and gNB 120-1 or 120-2 as shown in FIG. 1. As shown, the device 600 includes one or more processors 610, one or more memories 640 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
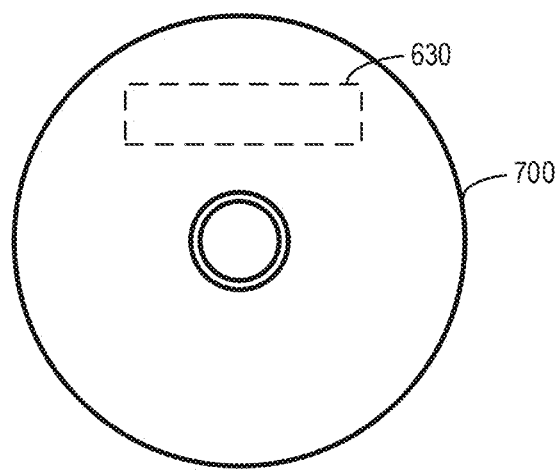
FIG. 7 shows a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400-500 as described above with reference to FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claim.

What is claimed is:

1. A first device comprising:
at least one processor; and
at least one memory including computer program codes;
the at least one memory and the computer program codes are configured to, with the at least one processor, cause the first device at least to:
generate a report, the report including information related to a measurement relaxation that is performed by the first device based on a measurement relaxation configuration,
the report being associated with a Radio Link Failure, RLF,
the measurement relaxation being associated with a relaxation on a measurement comprising at least one of
a Radio Link Monitoring, RLM, measurement,
a Beam Failure Detection, BFD, measurement, or
a Radio Resource Management, RRM, and
the information indicating at least
whether the measurement relaxation was allowed based on a dedicated command from a second device; and
transmit the report to the second device.

2. The first device of claim 1, wherein the information comprises the measurement relaxation configuration.

3. The first device of claim 1, wherein the information is associated with a field related to a RLF reason in the RLF report.

4. The first device of claim 1, wherein the first device is caused to transmit the information by:
transmitting the information via a radio resource complete message in at least one of:
a radio resource control re-establishment procedure, a radio resource control setup procedure, or
a radio resource control reconfiguration procedure.

5. The first device of claim 1, wherein the first device is further caused to:
transmit an indication of an availability of the information via a radio resource complete message in at least one of:
a radio resource control re-establishment procedure,
a radio resource control setup procedure, or
a radio resource control reconfiguration procedure.

6. The first device of claim 1, wherein the first device is further caused to:
add the information to the successful handover report based on a command from the second device or at least one relaxation criterion.

7. The first device of claim 1, wherein the first device is caused to:
receive the measurement relaxation configuration from:
the second device; or
a third device, the first device being serving by the third device before performing a handover procedure to the second device.

8. The first device of claim 1, wherein the first device comprises a terminal device and the second device comprises a network device.

9. The first device of claim 1, wherein the information indicates at least one of
at least one relaxation criterion indicated in the measurement relaxation configuration is fulfilled;
a margin for a determination of a satisfied serving cell quality condition; or
an evaluation measure for satisfied low mobility condition.

10. A second device comprising:
at least one processor; and
at least one memory including computer program codes;
the at least one memory and the computer program codes are configured to, with the at least one processor, cause the second device at least to:
receive, from a first device, a report including information related to a measurement relaxation,
the report being associated with a Radio Link Failure, RLF,
the measurement relaxation being associated with a relaxation on a measurement comprising at least one of
a Radio Link Monitoring, RLM, measurement,
a Beam Failure Detection, BFD, measurement, or
a Radio Resource Management, RRM, and
the information indicating at least
whether the measurement relaxation was allowed based on a dedicated command from the second device; and
determine, based on the report, an adjustment to a measurement relaxation configuration.

11. The second device of claim 10, wherein the second device is caused to determine the adjustment by:
determining the adjustment for a mobility configuration based on the report.

12. The second device of claim 10, wherein the second device is caused to determine the adjustment by:

in accordance with a determination, based on the report, that the RLF occurs, determining the adjustment for one or more parameters related to the measurement relaxation.

13. The second device of claim 10, wherein the second device is caused to determine the adjustment by:
in accordance with a determination, based on the report, that the RLF occurs, determining the adjustment for one or more parameters related to the RLM.

14. The second device of claim 10, wherein the second device is further caused to:
determine the measurement relaxation configuration for the first device; and
transmit the measurement relaxation configuration to the first device.

15. The second device of claim 10, wherein the second device is caused to determine the adjustment by:
in accordance with a determination, based on the report, that the handover to the second device is successful without the RLF, adjusting the measurement relaxation configuration configured by the second device based on a further measurement relaxation configuration configured by a third device, the first device being served by the third device before the handover completes.

16. The second device of claim 10, wherein the first device comprises a terminal device and the second device comprises a network device.

17. A method comprising:
generating, at a first device, a report, the report including information related to a measurement relaxation that is performed by the first device based on a measurement relaxation configuration,
the report being associated with a Radio Link Failure, RLF,
the measurement relaxation being associated with a relaxation on a measurement comprising at least one of:
a Radio Link Monitoring, RLM, measurement,
a Beam Failure Detection, BFD, measurement, or
a Radio Resource Management, RRM, and
the information indicating at least
whether the measurement relaxation was allowed based on a dedicated command from a second device; and
transmitting the report to the second device.

18. A method comprising:
receiving, from a first device, a report including information related to a measurement relaxation,
the report being associated with a Radio Link Failure, RLF,
the measurement relaxation being associated with a relaxation on a measurement comprising at least one of
a Radio Link Monitoring, RLM, measurement,
a Beam Failure Detection, BFD, measurement, or
a Radio Resource Management, RRM, and
the information indicating at least
whether the measurement relaxation was allowed based on a dedicated command from a second device; and
determining, based on the report, an adjustment to a measurement relaxation configuration.

* * * * *